US010482723B2

(12) United States Patent
Swaine et al.

(10) Patent No.: US 10,482,723 B2
(45) Date of Patent: Nov. 19, 2019

(54) MULTIDIRECTIONAL MEDIA DISPENSING SELF SERVICE TERMINAL

(71) Applicant: NCR Corporation, Atlanta, GA (US)

(72) Inventors: Stephen W. Swaine, Perthshire (GB); Andrew Colley, Dundee (GB); Derek Pont, Scotland (GB)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/041,980

(22) Filed: Jul. 23, 2018

(65) Prior Publication Data
US 2018/0330580 A1 Nov. 15, 2018

Related U.S. Application Data

(62) Division of application No. 14/927,986, filed on Oct. 30, 2015, now Pat. No. 10,068,436.

(51) Int. Cl.
G07F 19/00 (2006.01)
G06Q 20/18 (2012.01)
G07F 11/04 (2006.01)
G07F 11/16 (2006.01)
G07F 11/42 (2006.01)

(52) U.S. Cl.
CPC .......... G07F 19/203 (2013.01); G06Q 20/18 (2013.01); G07F 11/045 (2013.01); G07F 11/165 (2013.01); G07F 11/42 (2013.01)

(58) Field of Classification Search
CPC .. H04N 5/2252; H04N 5/2256; H04N 5/2253; G03B 11/045; G03B 17/563; G07F 19/203; G07F 11/42; G07F 11/165; G07F 11/045; G06Q 20/18
See application file for complete search history.

(56) References Cited

U.S. PATENT DOCUMENTS

| 3,773,223 A | 11/1973 | Guidi et al. |
| 6,186,339 B1 * | 2/2001 | Saltsov ............... B65H 29/006 209/534 |
| 2006/0012113 A1 | 1/2006 | Ko |
| 2010/0170911 A1 | 7/2010 | Gunst et al. |
| 2011/0155540 A1 | 6/2011 | Ugajin |
| 2013/0153372 A1 * | 6/2013 | Suttie ..................... B65H 29/70 198/836.1 |
| 2016/0107318 A1 | 4/2016 | Sherritt |
| 2018/0057302 A1 | 3/2018 | Yokawa et al. |

OTHER PUBLICATIONS

"U.S. Appl. No. 14/927,986, Notice of Allowance dated May 10, 2018", 9 pgs.

* cited by examiner

Primary Examiner — Sonji N Johnson
(74) Attorney, Agent, or Firm — Schwegman, Lundberg & Woessner

(57) ABSTRACT

Embodiments of a system and method for multidirectional dispensing of media at a self-service terminal (SST) are generally described herein. A method for dispensing media at a SST may include rotationally pivoting a first arm of a media dispenser of the SST away from a second arm of the media dispenser to receive media in a first direction, and activating a first set of rollers of the first arm to dispense the media in a second direction, the second direction at an angle generally orthogonal to the first direction.

7 Claims, 9 Drawing Sheets

MULTIDIRECTIONAL MEDIA DISPENSING SELF SERVICE TERMINAL

BACKGROUND

A Self-Service Terminal (SST), such as an Automated Teller Machine (ATM), is used by consumers to conduct transactions. Common places for SSTs include a drive-up islands, grocery stores, or inside banks. Similarly, consumers use bank teller counters and drive-up island vacuum tubes to conduct transactions with a bank teller.

SUMMARY

In various embodiments, methods and systems for dispensing media in specified directions are presented.

According to an embodiment, a method for dispensing media at a self-service terminal (SST) may include rotationally pivoting a first arm of a media dispenser of the SST away from a second arm of the media dispenser to receive media in a first direction, and activating a transport mechanism of the first arm to dispense the media in a second direction, the second direction at an angle generally orthogonal to the first direction.

BRIEF DESCRIPTION OF THE DRAWINGS

In the drawings, which are not necessarily drawn to scale, like numerals may describe similar components in different views Like numerals having different letter suffixes may represent different instances of similar components. The drawings illustrate generally, by way of example, but not by way of limitation, various embodiments discussed in the present document.

DETAILED DESCRIPTION

Self-Service Terminals (SSTs), such as Automated Teller Machines (ATMs), assisted ATMs, and the like, are increasingly being used to replace or augment existing legacy teller counters and vacuum tube dispensers at drive-up islands of banks. Existing SSTs are often too large to aesthetically or physically fit into existing spaces.

Figure 1:
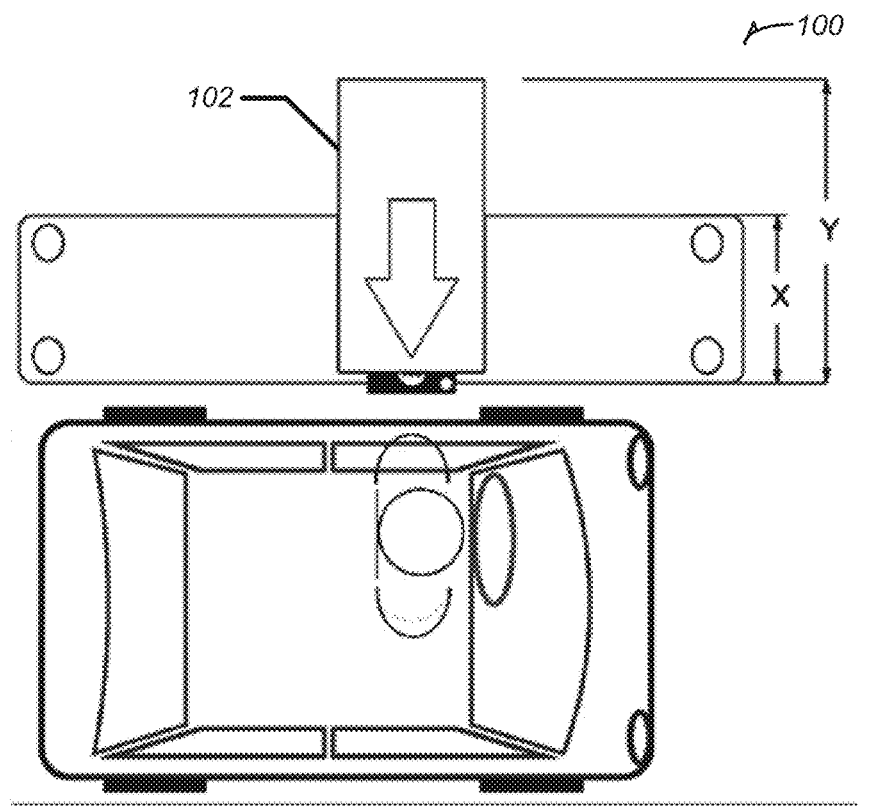
FIGS. 1 and 2 illustrate examples of drive-up islands with misconfigured Automated Teller Machines (ATMs) in accordance with some embodiments.
Figure 2:
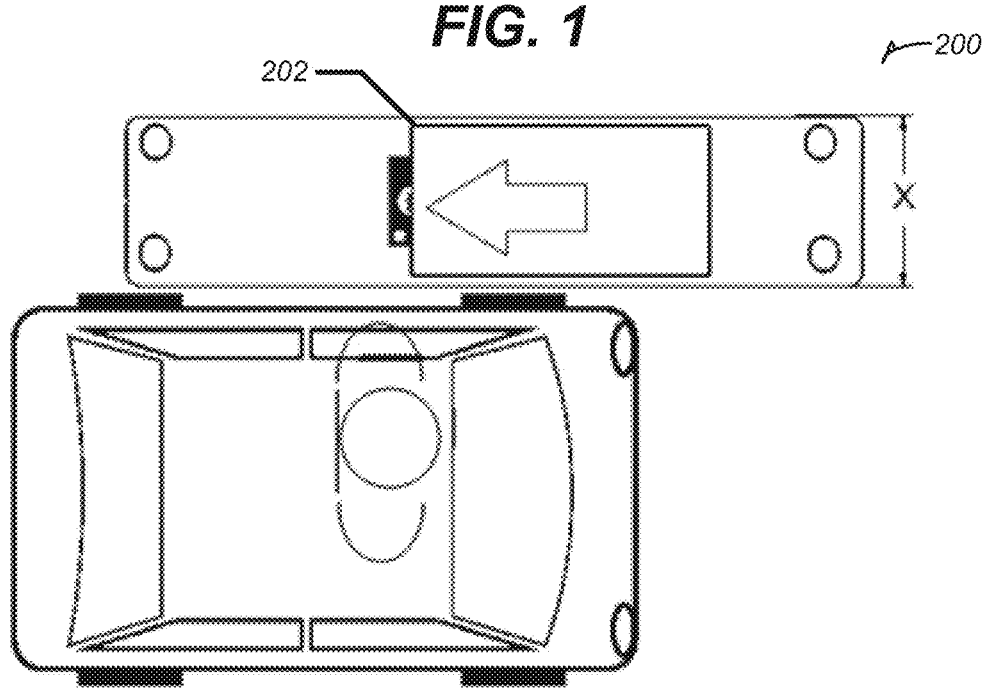

FIGS. 1 and 2 illustrate examples of drive-up islands 100 and 200 with misconfigured Automated Teller Machines (ATMs) 102 and 202 in accordance with some embodiments. The misconfigured ATMs 102 and 202 are traditional ATMs that do not fit in the narrow drive-up islands 100 and 200.

Some banks are considering replacing the narrow (e.g., typically 18 inches) drive-up teller installations where media is fed to a consumer by a vacuum tube system with ATMs. Until now only 36 inch wide teller lines have been replaced with ATMs because of the depth of traditional ATMs. Existing dispensers and security enclosure arrangements fit across these 36 inch wide islands but do not fit narrow islands. These existing dispensers and security enclosure arrangements will only fit onto an 18 inch island if they are placed along the island rather than across it, however the direction and position of the dispensed media is not reachable in a vehicle.

A traditional ATM 102 and security enclosure arrangement does not fit within a narrow (e.g., 18 inch wide) drive-up island 100. This arrangement is infeasible because the ATM would stick out into the next lane. Attempts to fit a traditional ATM into this narrow space results in the misconfigured ATM 202. When the traditional ATM 202 and security enclosure arrangement is turned 90 degrees and positioned along the narrow drive-up island 200, so that it does fit within the narrow drive-up island, the media dispense direction and position is difficult to reach from a vehicle, as shown in FIG. 2.

Figure 3:
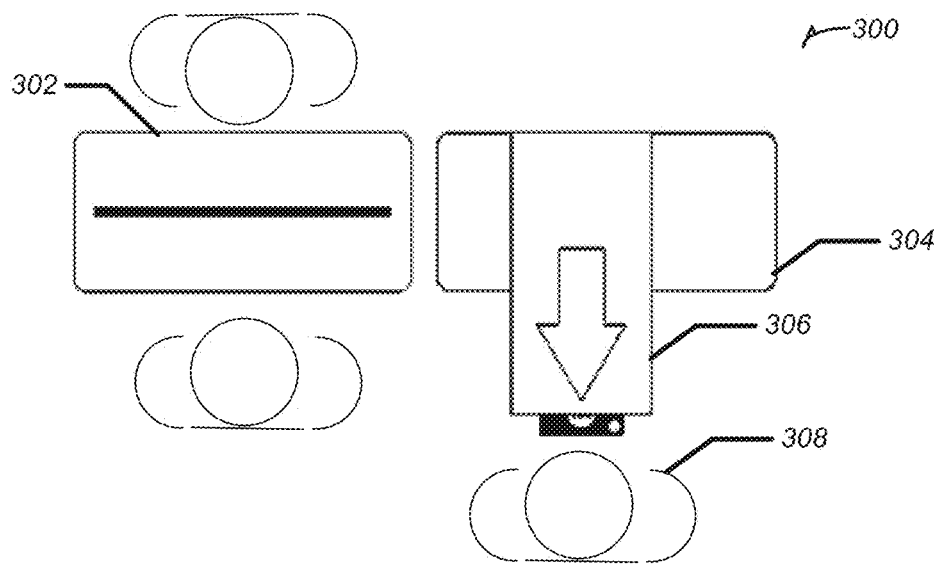
FIGS. 3 and 4 illustrate examples of teller counters with misconfigured ATMs in accordance with some embodiments.
Figure 4:
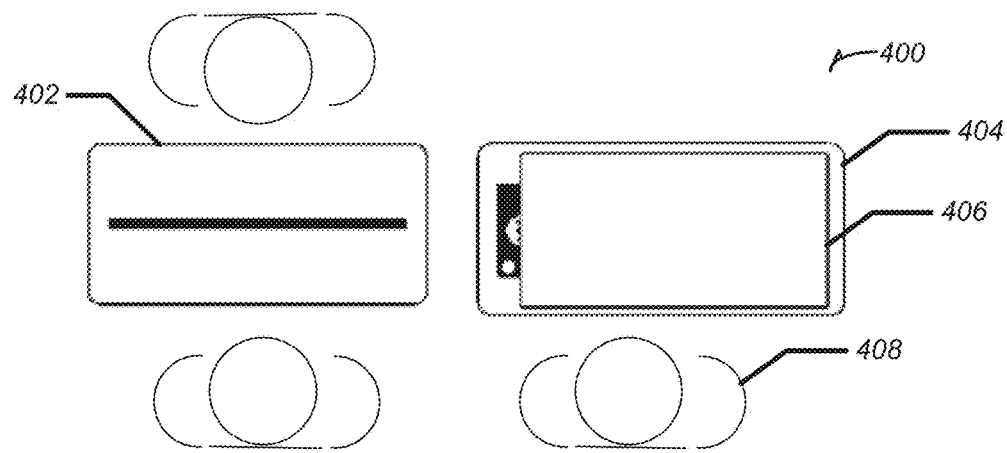

FIGS. 3 and 4 illustrate examples of teller counters 304 and 404 with misconfigured ATMs 306 and 406 in accordance with some embodiments. Globally there is a growing trend among some banks to install assisted ATMs within traditional bank teller counters. By doing so, the assisted ATMs may be serviced and replenished in a semi-secure environment behind the counter. The traditional ATM and security enclosure arrangement within assisted ATMs greatly increases the distance between a customer and the assisting teller which causes misconfigurations. For example, the increase in depth may negatively impact the customer and teller interaction. Similarly, orientating a traditional ATM dispenser and security enclosure arrangement within assisted ATMs so as to decrease the distance between a customer and the assisting teller, introduces the problem of the media being difficult to access by the customer or the teller.

FIG. 3 shows a teller counter arrangement 300 with a first teller counter 302 not having an assisted ATM and a second teller counter having an assisted ATM 306. The assisted ATM 306 is shown sticking out towards the customer 308 in an awkward and undesirable arrangement. FIG. 4 shows a teller counter arrangement 400 with a first teller counter 402 not having an assisted ATM and a second teller counter 404 having an assisted ATM 406. The assisted ATM 406 is shown in parallel with the teller counter 404, at an awkward and undesirable arrangement. Both assisted ATMs 306 and 406 are arranged to potentially cause insecure transactions, unreachable dispensed currency, or ineffective service.

Figure 5:
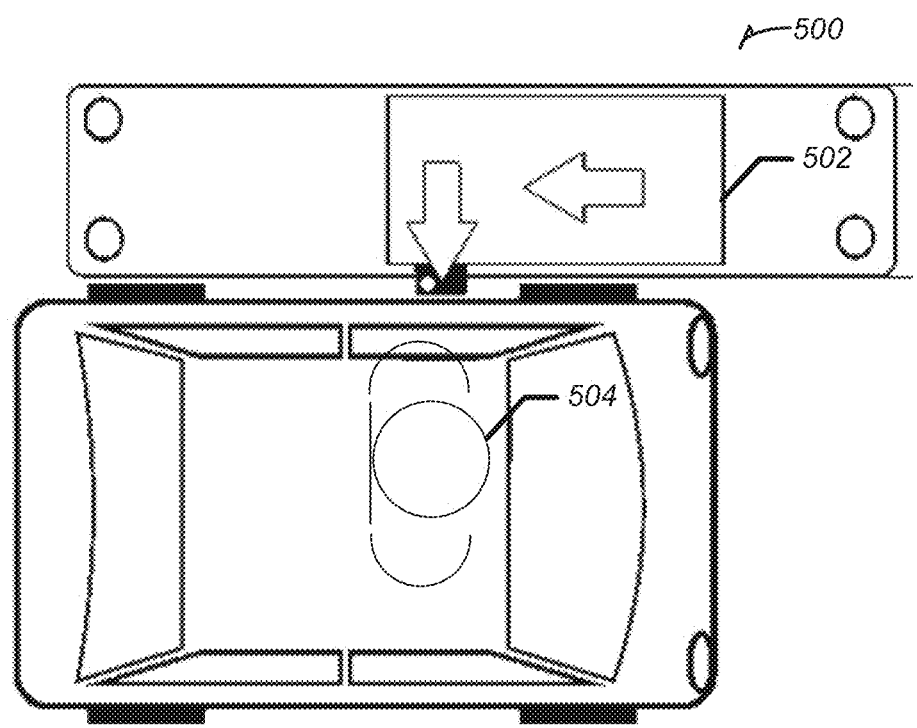
FIG. 5 illustrates a drive-up island with a properly configured ATM in accordance with some embodiments.

FIG. 5 illustrates a drive-up island 500 with a properly configured ATM 502 in accordance with some embodiments. The currency dispensed from the ATM 502 is easily reachable by the customer 504 from a car and the ATM 502 fits on the drive-up island 500 without sticking into another lane. FIG. 5 illustrates that when currency is dispensed at 90 degree to the traditional direction of travel in a traditional ATM security enclosure, the currency is easier to access by the customer 504.

Figure 6:
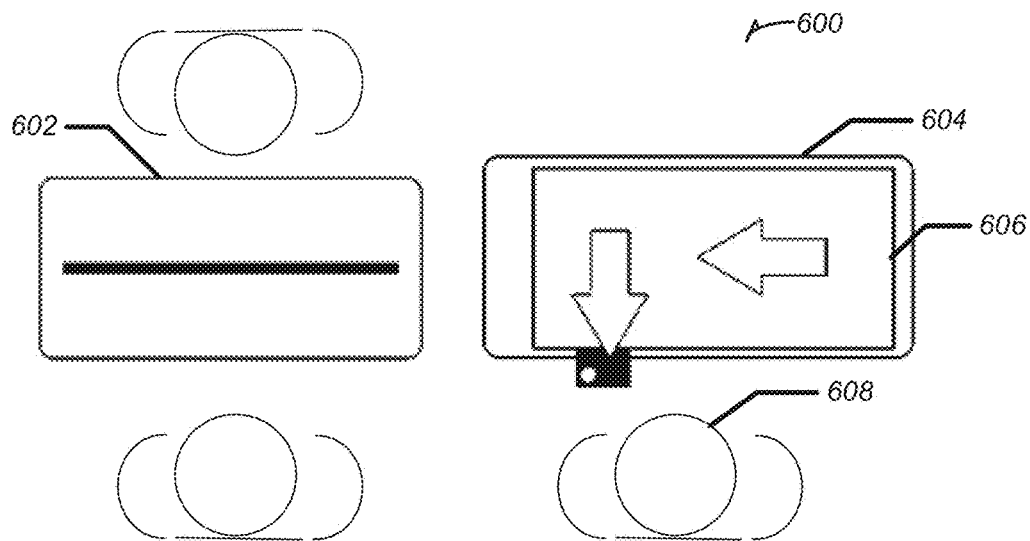
FIGS. 6 and 7 illustrate teller counters with properly configured ATMs in accordance with some embodiments.
Figure 7:
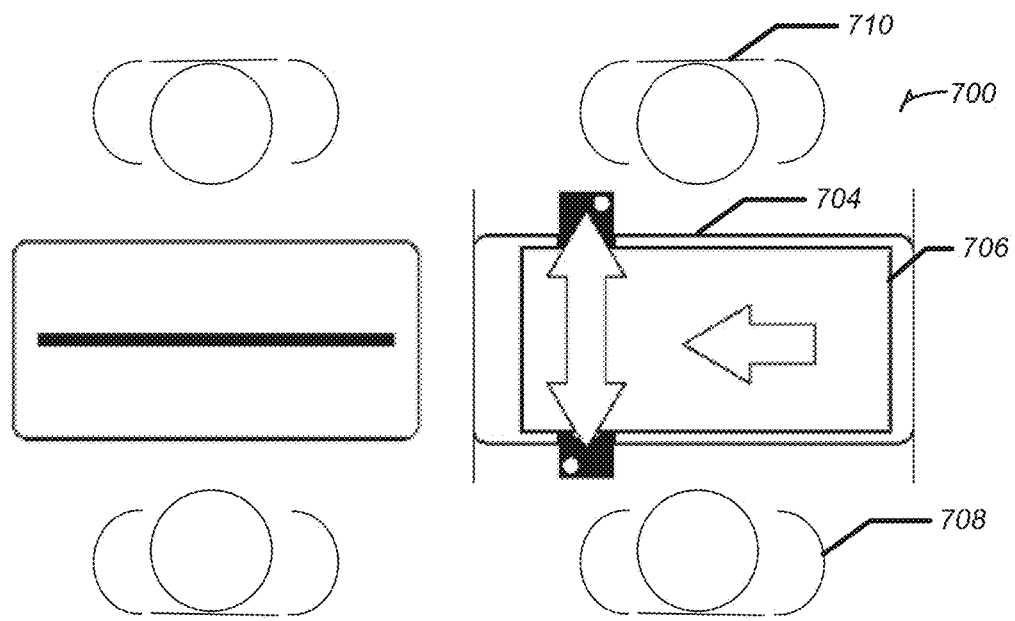

FIGS. 6 and 7 illustrate teller counters 600 and 700 with properly configured ATMs 606 and 706 in accordance with some embodiments. FIGS. 6 and 7 illustrate that if the currency is dispensed at 90 degree to the traditional direction of travel in a traditional ATM security enclosure, the currency is easier to access by the customer (e.g., customers 608 or 708) or teller (e.g., 710). Teller counter arrangement 600 illustrates an ATM 606 without teller-side interaction. ATM 606 fits on the teller counter 604, while teller counter 602 does not have an ATM. ATM 606 may be accessed by customer 608 easily without the ATM 606 sticking out like ATM 306 of FIG. 3. ATM 606 dispenses currency that is easily accessed by customer 608 without reaching and without being presented at an awkward angle, like ATM 406 of FIG. 4. Assisted ATM 706 fits on teller counter 704 in FIG. 7 and presents currency in two directions. The first direction allows customer 708 to easily access the currency, and the second direction allows teller 710 to easily access the currency.

Figure 8A:
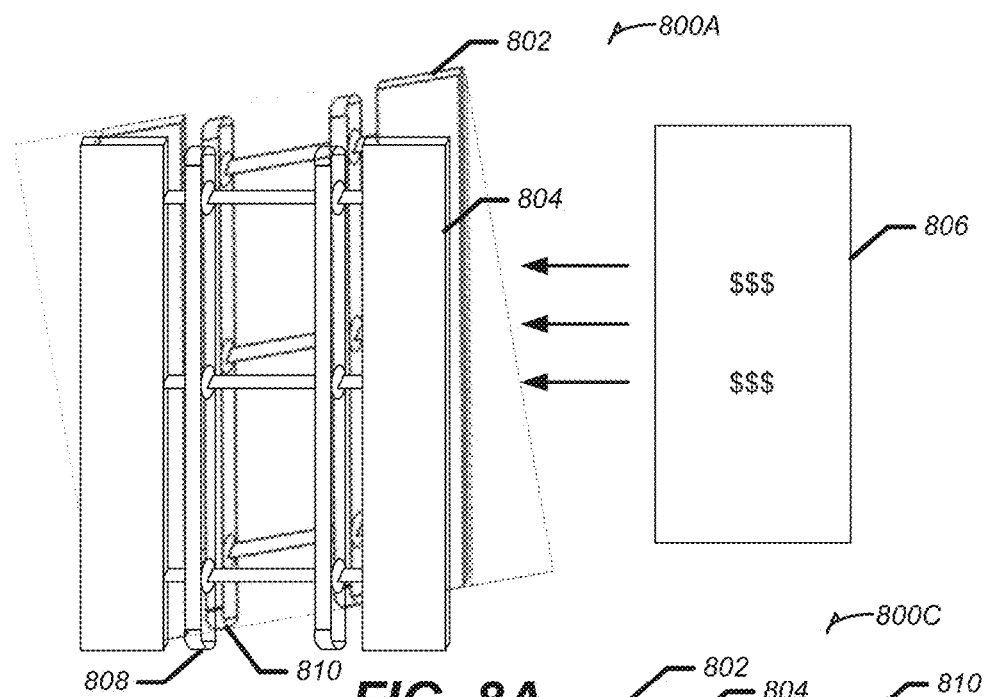
FIGS. 8A-C illustrate a media dispenser in various operational configurations in accordance with some embodiments.
Figure 8B:
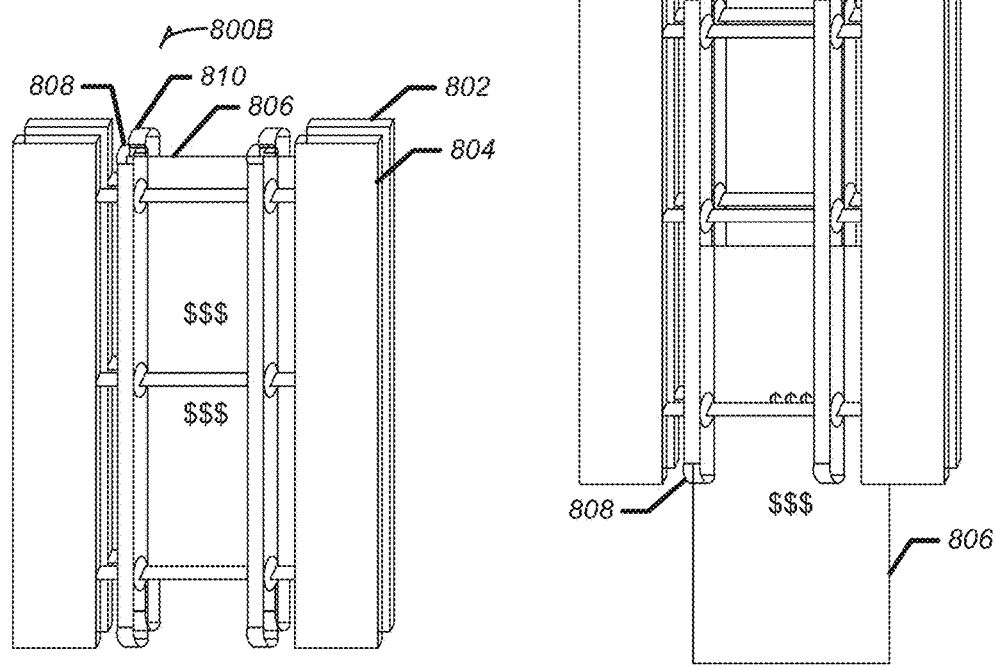
Figure 8C:
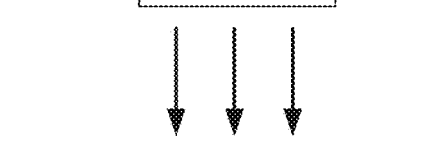

FIGS. 8A-C illustrate a media dispenser (800A-C) in various operational configurations in accordance with some embodiments. FIG. 8A illustrates the media dispenser 800A in a first configuration. The media dispenser 800A includes a first arm 802 and a second arm 804. The first arm 802 includes a first set of rollers 810 and the second arm 804 includes a second set of rollers 808. In an example, the sets of rollers 808 and 810 include treads or wraps to convey media. For example, the rollers may include rubber treads around the rollers that may contact the media and dispense it. Other types of treads may be used. In another example, the set of rollers 808 and 810 include many rollers without additional treads or wraps. In yet another example, only one of the arms 802 and 804 may include a set of rollers. In another example, the arms may use a different mechanism to move the currency in the second direction instead of a set or sets of rollers. Any of these examples for conveying the media in the second direction may be called a transport mechanism.

Media dispenser 800A may start in a different configuration (e.g., with arm 802 closed against arm 804) and change to the position shown (e.g., by having arm 802 rotate open or rotationally pivot). In an example, changing arm positions may be called translating, including rotationally translating, moving vertically or horizontally, or a combination of movements, rotations, or both. At the position shown, media dispenser 800A may receive media 806. The media 806 may be received at the dispenser 800A from a source internal to an SST, of which the media dispenser 800A may be a part. In an example, the media 806 may be received in a first direction, such as with the long end of the media moving towards the media dispenser 800A. In another example, the media 806 may be received from different internal SST dispensers.

FIG. 8B shows the first arm 802 and the second arm 804 in a closed position. The first arm 802, for example, may rotate from its position in FIG. 8A to close against arm 804. The media placed in the media dispenser as shown in 800A may be secured in the media dispenser as shown in 800B. The closed position for arms 802 and 804 may hold the media in compression or compressively secure the media. In an example, one or both of arms 802 and 804 may include a spring such that any amount of media may be compressively secured. For example, a single bill of media to be dispensed is less thick than a dozen bills of media to be dispensed. In an example, a single bill or a few bills may be compressed by the second arm 804 against the first arm 802 using the spring, such as at or near a minimum compression of the spring. In another example, a large number of bills may be compressed by the second arm 804 against the first arm 802 using the spring, such as with a more compressed spring. In yet another example, the first arm 802 may be configured to rotate away from the second arm 804 and the second arm 804 may include the spring. In another example, this configuration may be switched. In still another example, both arms may be configured to rotate, and one or both of the arms may include a spring.

The media dispense system of FIGS. 8A-C, may be coupled with a traditional dispenser (e.g., an internal SST dispenser). In an example, the media dispense system may dispense media in a plurality of directions, including a first and second direction, both at substantially 90 degrees to the traditional dispense direction of an SST and at substantially 180 degrees to each other. Minor variances in the degrees is acceptable and an exact right angle or 180 degree angle is not required. In another example, other angles, such as a 45 degree angle or 135 degree angle may be used.

FIG. 8C shows the media dispenser 800C with the first arm 802 and the second arm 804 at the same orientation as shown in 800B. Between configurations 800B and 800C, the first set of rollers 810 or the second set of rollers 808 or both may be activated to dispense the media 806 as shown in 800C. The media 806 may be dispensed at a second direction at approximately a right angle to the first direction shown in 800A. In the example where both sets of rollers 808 and 810 are activated, for configuration 800C, the first set of rollers 801 may rotate counterclockwise and the second set of rollers 810 may rotate clockwise. The opposite rotation of the two sets of rollers 808 and 810 may be reversed to dispense the media in a third direction, the third direction at substantially a right angle to the first direction of 800A and at substantially a 180 degree angle to the second direction.

Figure 9A:
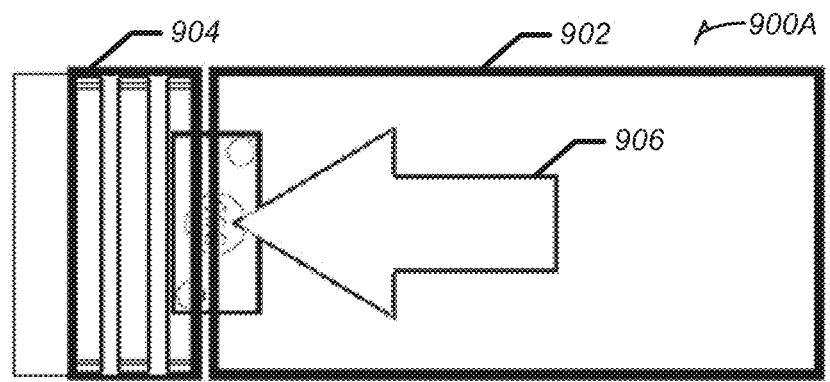
FIGS. 9A-C illustrate a self-service terminal (SST) configured to dispense media in multiple directions in accordance with some embodiments.
Figure 9B:
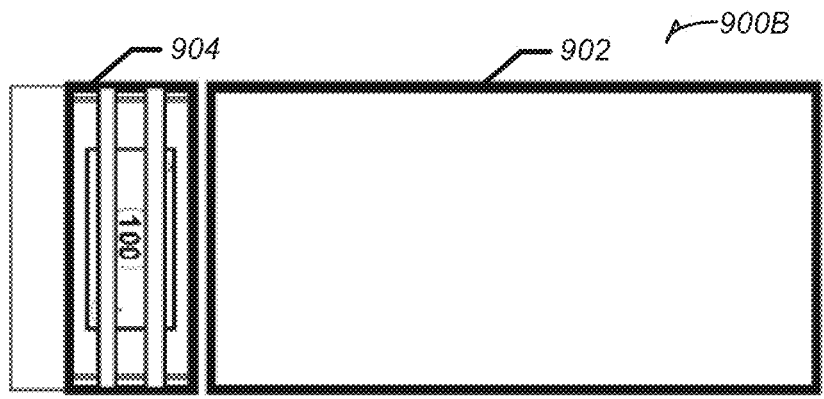
Figure 9C:
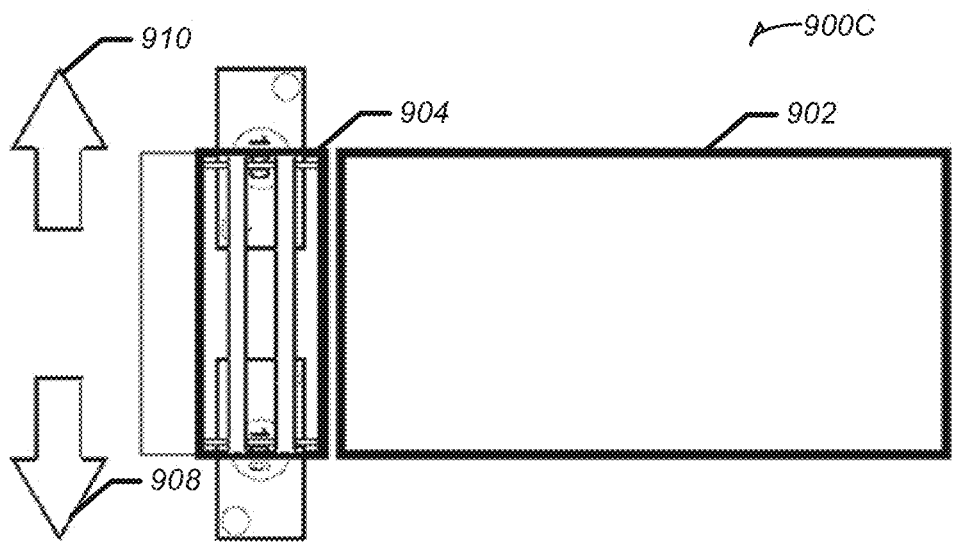

FIGS. 9A-C illustrate a valuable media dispenser 900A-C configured to dispense media in multiple directions in accordance with some embodiments. The valuable media dispenser shown in FIG. 9A in configuration 900A includes an internal dispenser 902 and a media dispenser 904. The internal dispenser 902 dispenses media in a first direction 906 to the media dispenser 904. In an example, the internal dispenser 902 may aggregate or receive media from one or more storage buckets before dispensing the media in the first direction 906. Configuration 900B of FIG. 9B shows the media held (e.g., compressed) in the media dispenser 904. In an example, the media dispenser 904 may include the media dispenser 800A-C as shown in FIGS. 8A-8C. FIG. 9C shows configuration 900C of the valuable media dispenser. Configuration 900C shows two optional dispense directions for the media dispenser 904. The second dispense direction 908 is at approximately a right angle to the first direction 906. The third dispense direction 910 is at approximately a right angle to the first direction 906 as well, and is at approximately a 180 degree angle to the second dispense direction 908.

As shown in configuration 900C, when dispensed from the media dispenser 904, the media may partially exit the media dispenser 904 or valuable media dispenser 900C. The configuration 900C shows media partially exiting the media dispenser 904 in the second dispense direction 908 and media partially exiting the media dispenser 904 in the third dispense direction 910. In an example, the media dispenser 904 may dispense media in only one of the first and second dispense directions 908 and 910. In another example, the media dispenser 904 may dispense in both dispense directions 908 and 910 at the same time. In another example, the media may partially or fully exit the valuable media dispenser, such as by spraying into a basket. The media dispenser 904 may spray the media into the basket (e.g., drop it into, eject it into, or the like).

Figure 10:
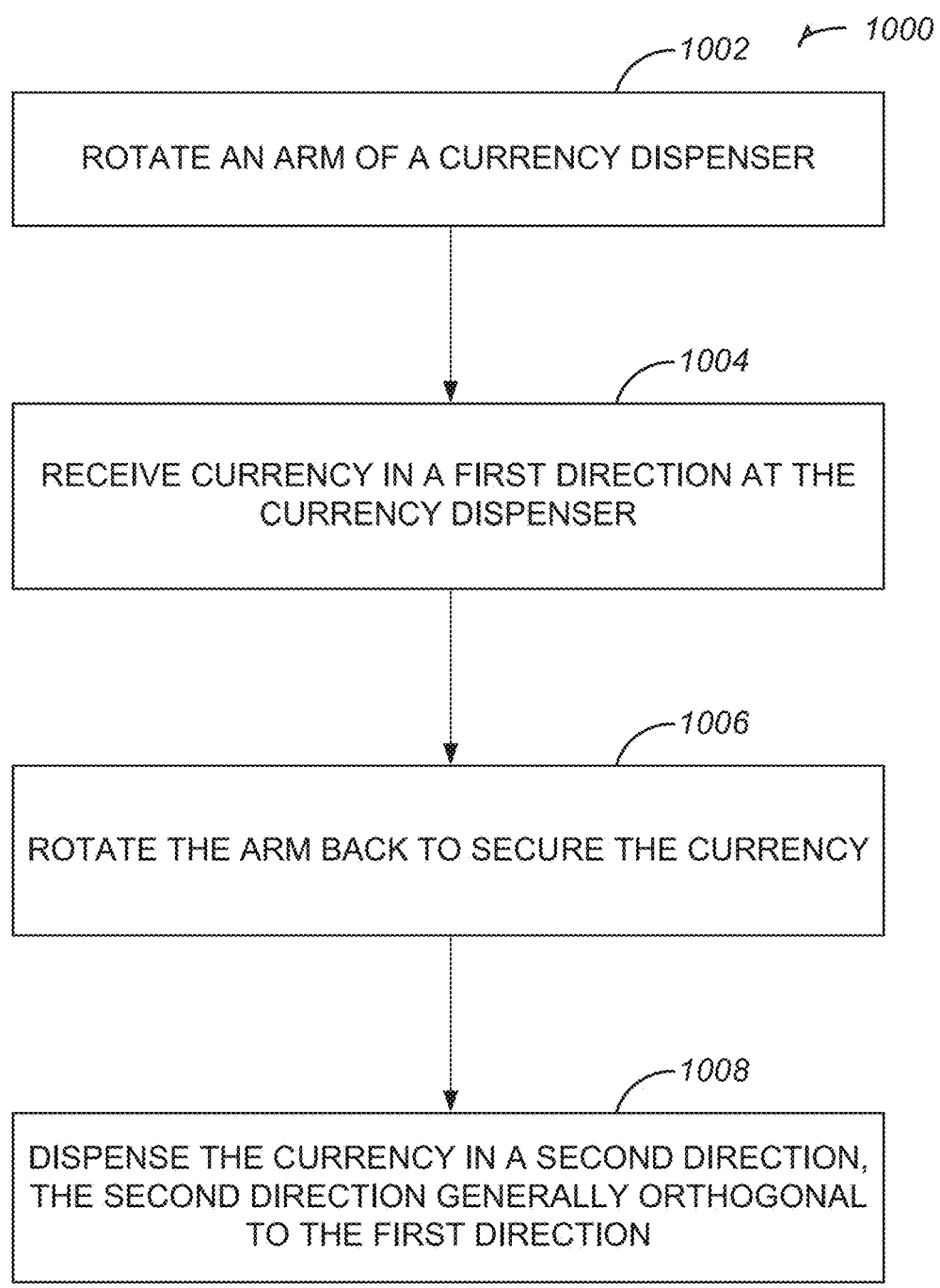
FIG. 10 illustrates generally a flowchart showing a technique for dispensing media in accordance with some embodiments.

FIG. 10 illustrates generally a flowchart showing a technique 1000 for monitoring endpoint devices in accordance with some embodiments.

The technique 1000 includes an operation 1002 to rotate an arm of a media dispenser, such as by rotationally pivoting the arm away from a second arm such that the media dispenser may receive media.

The technique 1000 includes an operation 1004 to receive media in a first direction at the media dispenser.

The technique 1000 includes an operation 1006 to rotate the arm back to an original position to secure the media, such as by rotating the arm closed with respect to the second arm. The media may be secured compressively, such as by using a spring in one or both of the arms. In an example, securing the media may include activating a spring of a second arm to hold the media.

The technique 1000 includes an operation 1008 to dispense the media in a second direction, the second direction generally orthogonal to the first direction. In an example, the media may be dispensed in a third direction, the third direction at an angle generally orthogonal to the first direction and inverse to the second direction. To dispense the media, the technique 1000 may use a set of rollers, such as a set of rollers in the arm. In another example, the technique 1000 may use a first set of rollers in the arm and a second set of rollers in a second arm. The technique 1000 may include activating the set of rollers in the media dispenser to move the media in the second direction, such as by activating the set of rollers in the media dispenser to move the media to a position at least partially outside the valuable media dispenser.

The technique 1000 may include opening a service door of the valuable media dispenser to receive additional media. In an example, the service door may be opposite or adjacent to the media dispenser in the valuable media dispenser.

Figure 11A:
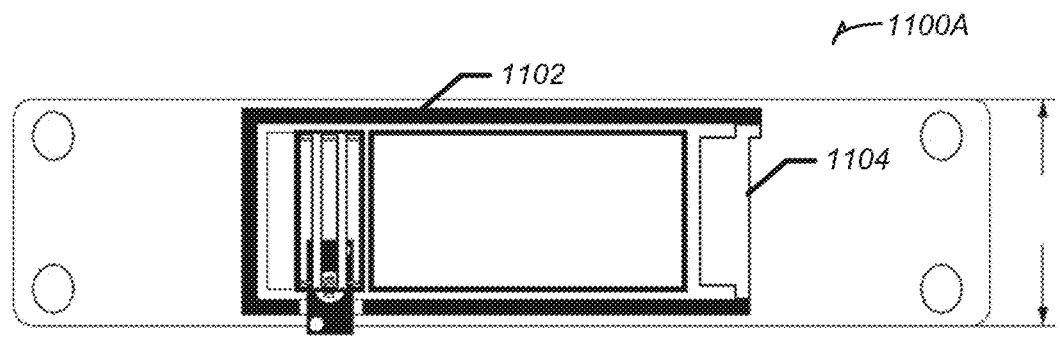
FIGS. 11A-B illustrate an ATM on a drive-up island including a service door in accordance with some embodiments.
Figure 11B:
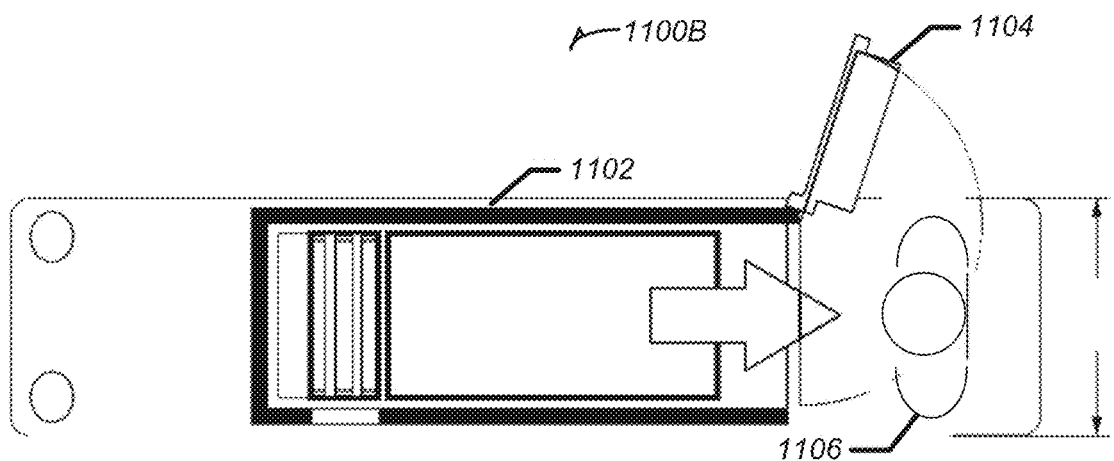

FIGS. 11A-B illustrate an ATM 1102 on a drive-up island (e.g., configurations 1100A and 1100B) including a service door 1104 in accordance with some embodiments. Configuration 1100A shows service door 1104 closed and configuration 1100B shows service door 1104 open. In an example, a specially designed security enclosure may permit the previously described media dispensers to fit along the length of a narrow drive-up island. The enclosure may be serviced from the side using service door 1104. ATM 1102 has an opening for the dispensed media on the side of the enclosure, rather than on the end as shown with the media partially exiting the SST. This orientation of security enclosure and opening at the side allows the enclosure to be serviced or replenished at the narrow end of the drive-up island rather than behind or in front where traffic may interrupt or endanger servicing. This configuration may be safer than other configurations for a drive-up island.

Media dispensed from a media dispenser may include currency, such as physical bills, stamps or a book of stamps, other valuable paper products, valuable plastic products, or the like.

Figure 12A:
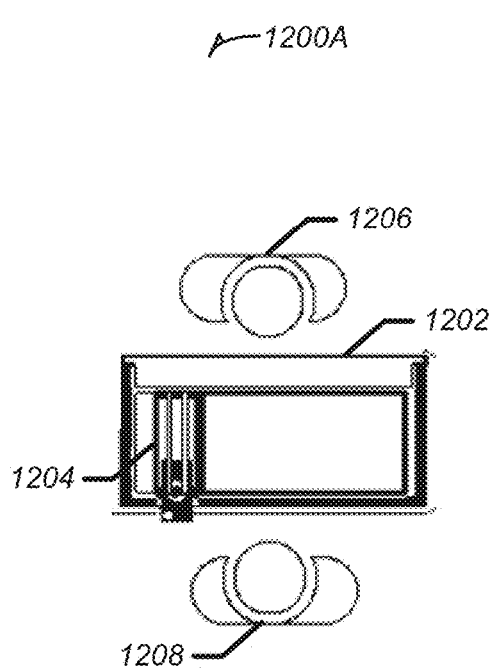
FIGS. 12A-B and 13A-B illustrate ATMs of a teller counter including a service door in accordance with some embodiments.
Figure 12B:
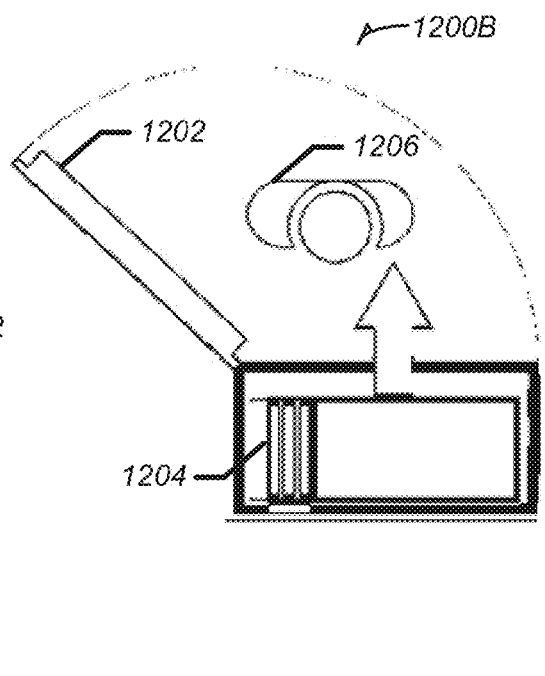

FIGS. 12A-B and 13A-B illustrate ATMs 1202 and 1302 of a teller counter (e.g., 1200A-B and 1300A-B) including a service door (e.g., 1202 and 1302) in accordance with some embodiments. FIGS. 12A-B illustrate a specially designed security enclosure that permits the currency dispenser 1204 to fit along the width of a bank teller counter (e.g., 1200A-B). The ATM 1202 shown in configuration 1200A may include an opening for the dispensed currency on the customer side of the enclosure to a customer 1208. The ATM 1202 may allow the enclosure to be serviced from the teller side by a teller 1206 using service door 1202 (e.g., in configuration 1200B). This orientation of security enclosure may minimize the depth of the counter required to house the ATM 1202 and may provide a more integrated ATM 1202.

Figure 13A:
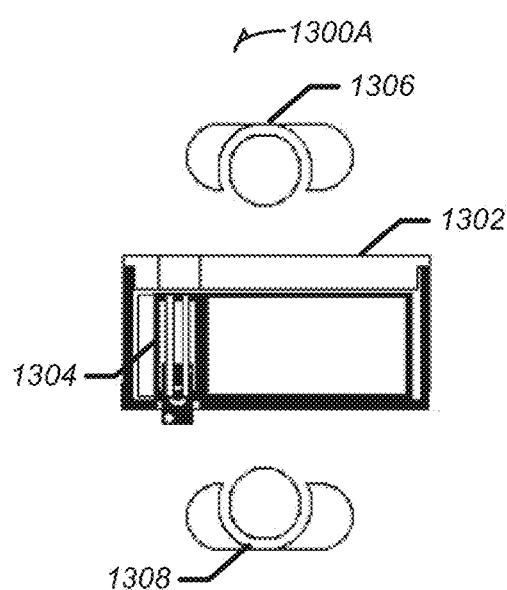
Figure 13B:
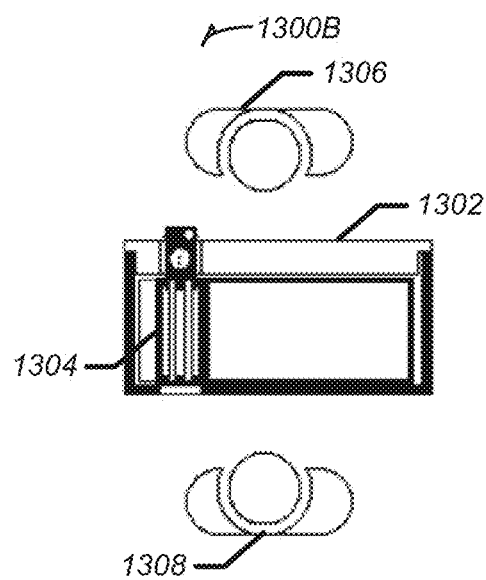

FIGS. 13A-B illustrate a specially designed security enclosure that permits the currency dispenser 1304 to fit along the width of a bank teller counter. The ATM includes an opening for currency to be dispensed on the customer side to a customer 1308 as shown in configuration 1300A and for currency to be dispensed on the teller side to a teller 1306 as shown in configuration 1300B. This orientation of security enclosure may minimize the depth of the counter required to house it and may provide a closer distance between teller 1306 and customer 1308. This example may provide the teller 1306 with dispensed the currency, such as by using the ATM as an assisted ATM. An assisted ATM may provide a more personal customer experience. The ATM includes a service door 1302 (shown in both configurations 1300A-B as closed) that may be opened, such as by teller 1306 to service the ATM. The service door 1302 includes a slot or hole to dispense currency to the teller through the service door 1302.

VARIOUS NOTES & EXAMPLES

Each of these non-limiting examples may stand on its own, or may be combined in various permutations or combinations with one or more of the other examples.

Example 1 is a method for dispensing currency at a self-service terminal (SST), the method comprising: rotationally pivoting a first arm of a currency dispenser of the SST away from a second arm of the currency dispenser to receive currency in a first direction; and activating a first set of rollers of the first arm to dispense the currency in a second direction, the second direction at an angle generally orthogonal to the first direction.

In Example 2, the subject matter of Example 1 optionally includes, further comprising returning the first arm to an original position that is generally parallel to the second arm to hold the currency before activating the first set of rollers.

In Example 3, the subject matter of any one or more of Examples 1-2 optionally include, further comprising activating a second set of rollers to turn opposite the first set of rollers to cause the currency to move in the second direction.

In Example 4, the subject matter of any one or more of Examples 1-3 optionally include, further comprising activating the first set of rollers to dispense currency in a third direction, the third direction at an angle generally orthogonal to the first direction and generally inverse to the second direction.

Example 5 is a self-service terminal (SST) comprising: a currency dispenser including a first arm having a first set of rollers and a second arm having a second set of rollers, the currency dispenser configured to: rotationally pivot the first arm in a first rotational direction with respect to the second arm to create a currency receptacle; receive currency at the currency receptacle in a first dispense direction from a source internal to the SST; close the currency receptacle by rotationally pivoting the first arm in a second rotational direction opposite the first rotational direction to compressively secure the currency; and dispense the currency in a second dispense direction by turning the first set of rollers and the second set of rollers, the second dispense direction being at an angle generally orthogonal to the first dispense direction.

In Example 6, the subject matter of Example 5 optionally includes, wherein to dispense the currency in the second dispense direction includes to dispense the currency to at least partially exit the SST.

In Example 7, the subject matter of any one or more of Examples 5-6 optionally include, wherein the SST includes an automatic teller machine (ATM).

In Example 8, the subject matter of Example 7 optionally includes, wherein the SST includes an assisted ATM.

In Example 9, the subject matter of any one or more of Examples 5-8 optionally include, wherein the currency dispenser is configured to dispense the currency in a third dispense direction by turning the first set of rollers and the second set of rollers, the third direction at an angle generally orthogonal to the first direction and generally inverse to the second direction.

In Example 10, the subject matter of any one or more of Examples 5-9 optionally include, wherein to close the currency receptacle includes to activate a spring of the second arm to compress the currency.

In Example 11, the subject matter of any one or more of Examples 5-10 optionally include, wherein the SST includes a first end configured to dispense the currency and a second end configured to open as a service door.

In Example 12, the subject matter of Example 11 optionally includes, wherein the second end is opposite or adjacent to the first end and the service door is configured to rotate open.

In Example 13, the subject matter of any one or more of Examples 5-12 optionally include, wherein the first set of rollers and the second set of rollers are positioned on opposite sides of the currency after the currency is compressed.

Example 14 is a method of dispensing currency at a self-service terminal (SST), the method comprising: moving currency in a first direction from an internal depository of the SST to a currency dispenser; securing the currency by rotating an arm of the currency dispenser; and activating a set of rollers in the currency dispenser to move the currency in a second direction, the second direction at an angle generally orthogonal to the first direction.

In Example 15, the subject matter of Example 14 optionally includes, further comprising activating the set of rollers to dispense currency in a third direction, the third direction generally orthogonal to the first direction and inverse to the second direction.

In Example 16, the subject matter of any one or more of Examples 14-15 optionally include, wherein activating the set of rollers in the currency dispenser to move the currency in the second direction includes activating the set of rollers in the currency dispenser to move the currency to a position at least partially outside the SST.

In Example 17, the subject matter of any one or more of Examples 14-16 optionally include, wherein securing the currency includes activating a spring of a second arm to hold the currency.

In Example 18, the subject matter of any one or more of Examples 14-17 optionally include, further comprising opening a service door of the SST to receive additional currency.

In Example 19, the subject matter of Example 18 optionally includes, wherein the service door is opposite the currency dispenser in the SST.

In Example 20, the subject matter of any one or more of Examples 18-19 optionally include, wherein the service door is adjacent to the currency dispenser in the SST.

Example 21 includes at least one machine-readable medium including instructions for receiving information, which when executed by a machine, cause the machine to perform any of the methods of Examples 14-20.

Example 22 includes an apparatus comprising means for performing any of the methods of Examples 14-20.

Example 23 is a media dispenser for inclusion in a self-service terminal (SST). The media dispenser comprises a pick unit operable to pick media items from a media store; a first transport operable to convey a picked media item from the pick unit to an intermediate staging area; and a second transport operable to convey media from the intermediate staging area to a customer delivery area by moving the media in a transverse direction to the first transport. The first transport may be longer than the second transport. The first transport may include a diverter such that incorrectly picked media items (for example, double picks) may be diverted to a reject area within the media dispenser instead of being conveyed to the intermediate staging area. The first transport may convey media items to the intermediate staging area as a bunch of media items or as individual media items (that is, the first transport may comprise a spray or bunch delivery mechanism). The intermediate staging area may comprise a fixed guide and a movable guide (or two movable guides). The moveable guide may comprise an upper guide or a lower guide. The movable guide may comprise a pivoting guide or a guide movable parallel to the fixed guide by linkages. Each guide may comprise one or more endless belts and skid plates. The guides may abut a final transport connecting the intermediate staging area to the customer delivery area such that media items in the intermediate stating area may be conveyed from the intermediate staging area to the customer delivery area.

Example 24 is a method of dispensing media at a valuable media dispenser, the method comprising: moving media in a first direction from an internal depository of the valuable media dispenser to a media dispenser; securing the media by translating an arm of the media dispenser; and activating a transport mechanism in the media dispenser to move the media in a second direction, the second direction generally orthogonal to the first direction. The method may further comprise activating the transport mechanism to dispense media in a third direction, the third direction generally orthogonal to the first direction and inverse to the second direction. Activating the transport mechanism in the media dispenser to move the media in the second direction optionally includes activating the transport mechanism in the media dispenser to move the media to a position at least partially outside the valuable media dispenser. Securing the media optionally includes activating a spring of a second arm to hold the media. The method may further comprise opening a service door of the valuable media dispenser to receive additional media. The service door is optionally opposite or adjacent to the media dispenser in the valuable media dispenser. The valuable media dispenser may be incorporated into a self-service terminal (SST).

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A media dispenser comprising:
a media store operable to store a plurality of media items in sheet form;
a pick unit operable to pick media items from the media store;
an intermediate staging area coupled to the pick unit by a first transport, the first transport being operable to convey a picked media item from the pick unit to the intermediate staging area; and
a second transport operable to convey media from the intermediate staging area to a customer delivery area by moving the media in a direction transverse to the first transport, wherein the intermediate staging area includes a first arm and a second arm, the first arm initially closed against the second arm, wherein the first arm is configured to rotationally pivot with respect to the second arm to open to receive the picked media item from the first transport, wherein, after receiving the picked media item, the first arm is configured to rotationally pivot with respect to the second arm to close, securing the picked media item against the second arm.

2. A media dispenser according to claim 1, wherein the first transport is longer than the second transport.

3. A media dispenser according to claim 1, wherein the first transport includes a diverter such that incorrectly picked media items are be diverted to a reject area within the media dispenser instead of being conveyed to the intermediate staging area.

4. A media dispenser according to claim 1, wherein the intermediate staging area comprises a fixed guide and a movable guide, the moveable guide comprising an upper guide above the fixed guide or a lower guide below the fixed guide.

5. A media dispenser according to claim 4, wherein the movable guide comprises a pivoting guide.

6. A media dispenser according to claim 4, wherein the movable guide comprises a guide movable parallel to the fixed guide by linkages.

7. A media dispenser according to claim 4, wherein each guide comprises one or more endless belts and skid plates, and the guides abut a final transport in alignment therewith for connecting the intermediate staging area to the customer delivery area such that media items in the intermediate staging area may be conveyed from the intermediate staging area to the customer delivery area via the final transport.

* * * * *